(12) United States Patent
Sichel

(10) Patent No.: US 8,877,067 B2
(45) Date of Patent: Nov. 4, 2014

(54) METHOD AND ARRANGEMENT FOR A WATER TREATMENT

(75) Inventor: Cosima Sichel, Ulm (DE)

(73) Assignee: Evoqua Water Technologies LLC, Alpharetta, GA (US)

( * ) Notice: Subject to any disclaimer, the term of this patent is extended or adjusted under 35 U.S.C. 154(b) by 147 days.

(21) Appl. No.: 13/480,613

(22) Filed: May 25, 2012

(65) Prior Publication Data

US 2012/0298591 A1    Nov. 29, 2012

(30) Foreign Application Priority Data

May 26, 2011    (EP) ..................... 11167641

(51) Int. Cl.
| | | |
|---|---|---|
| *C02F 1/32* | (2006.01) | |
| *C02F 1/76* | (2006.01) | |
| C02F 101/30 | (2006.01) | |
| C02F 103/34 | (2006.01) | |
| C02F 1/28 | (2006.01) | |
| C02F 1/70 | (2006.01) | |
| C02F 1/72 | (2006.01) | |
| C02F 101/00 | (2006.01) | |

(52) U.S. Cl.
CPC .............. *C02F 1/76* (2013.01); *C02F 2101/306* (2013.01); *C02F 2201/3227* (2013.01); *C02F 2209/003* (2013.01); *C02F 2209/29* (2013.01); *C02F 2103/343* (2013.01); *C02F 1/283* (2013.01); *C02F 1/70* (2013.01); *C02F 1/32* (2013.01); *C02F 2303/185* (2013.01); *C02F 2201/326* (2013.01); *C02F 1/722* (2013.01); *C02F 2209/40* (2013.01); *C02F 2101/006* (2013.01); *C02F 2101/305* (2013.01); *C02F 2305/023* (2013.01); *C02F 2209/001* (2013.01)

USPC ...... 210/748.01; 210/199; 210/739; 210/753; 210/755; 210/758; 422/21; 422/22; 422/24; 422/186; 422/186.3; 250/250; 250/372; 250/200; 250/493.1

(58) Field of Classification Search
CPC ........ C02F 1/32; C02F 1/76; C02F 2209/003; C02F 2209/29
USPC ............... 210/748.01, 748.03, 748.05, 748.1, 210/748.11, 749, 748.2, 739, 753–755, 210/758; 422/21, 22, 24, 186, 186.3; 250/250, 372, 200, 493.1
See application file for complete search history.

(56) References Cited

U.S. PATENT DOCUMENTS

| | | |
|---|---|---|
| 2,008,684 A | 7/1935 | Craddock |
| 2,212,260 A | 8/1940 | Brothman |

(Continued)

FOREIGN PATENT DOCUMENTS

| | | |
|---|---|---|
| CA | 10-79423 A1 | 6/1980 |
| CN | 1098960 | 2/1995 |

(Continued)

OTHER PUBLICATIONS

Rola-Chem Corporation, "The New Wave in Water Management: Take Control with Rola-Chem," Product Catalog, Apr. 1999.

(Continued)

*Primary Examiner* — Joseph Drodge
*Assistant Examiner* — Cameron J Allen

(57) ABSTRACT

The invention relates to a water treatment using an UV AOP. The invention combines an UV AOP (11) applied to a water containing a free chlorine species (8) with a chemical post treatment (14), a quenching. The quenching (14) is applied to said water (9) after the UV AOP (11) able to reduce a remaining content of said free chlorine species in said water (9).

16 Claims, 2 Drawing Sheets

(56) References Cited

U.S. PATENT DOCUMENTS

| | | | |
|---|---|---|---|
| 2,249,263 A | 7/1941 | Wheelwright, Jr. | |
| 2,268,461 A | 12/1941 | Nichols | |
| 2,556,014 A | 6/1951 | Tolman | |
| 2,651,582 A | 9/1953 | Courtney | |
| 2,686,110 A | 8/1954 | Carver | |
| 2,740,696 A | 4/1956 | Longwell | |
| 2,833,624 A * | 5/1958 | Sprauer | 423/478 |
| 3,252,689 A | 5/1966 | Blomgren, Sr. et al. | |
| 3,319,937 A | 5/1967 | Wilson et al. | |
| 3,389,970 A | 6/1968 | Scheibel | |
| 3,536,646 A | 10/1970 | Hatch et al. | |
| 3,559,959 A | 2/1971 | Davis et al. | |
| T896,051 I4 | 3/1972 | Hamlin et al. | |
| 3,702,298 A | 11/1972 | Zsoldos et al. | |
| 3,742,735 A | 7/1973 | Verreyne et al. | |
| 3,747,899 A | 7/1973 | Latinen et al. | |
| 3,756,570 A | 9/1973 | Buhner | |
| 3,794,817 A | 2/1974 | Shinskey | |
| 3,852,234 A | 12/1974 | Venema | |
| 3,870,631 A | 3/1975 | Fassell et al. | |
| 3,965,027 A | 6/1976 | Boffardi et al. | |
| 4,016,078 A | 4/1977 | Clark | |
| 4,087,360 A | 5/1978 | Faust et al. | |
| 4,113,688 A | 9/1978 | Pearson | |
| 4,125,574 A | 11/1978 | Kastner et al. | |
| 4,146,676 A | 3/1979 | Saeman et al. | |
| 4,171,166 A | 10/1979 | Trowbridge et al. | |
| 4,217,145 A | 8/1980 | Gaddis | |
| 4,218,147 A | 8/1980 | Rosenberger | |
| 4,233,265 A | 11/1980 | Gasper | |
| 4,234,440 A | 11/1980 | Hirozawa et al. | |
| 4,241,016 A | 12/1980 | Hirozawa et al. | |
| 4,243,636 A | 1/1981 | Shiraki et al. | |
| 4,277,438 A | 7/1981 | Ejzak | |
| 4,300,909 A | 11/1981 | Krumhansl | |
| 4,340,489 A | 7/1982 | Adams et al. | |
| 4,402,836 A | 9/1983 | Fochtman et al. | |
| 4,433,701 A | 2/1984 | Cox et al. | |
| 4,456,512 A | 6/1984 | Bieler et al. | |
| 4,470,907 A | 9/1984 | Sencza | |
| 4,522,502 A | 6/1985 | Brazelton | |
| 4,550,011 A | 10/1985 | McCollum | |
| 4,575,678 A | 3/1986 | Hladky | |
| 4,581,074 A | 4/1986 | Mankina et al. | |
| 4,648,043 A | 3/1987 | O'Leary | |
| 4,664,528 A | 5/1987 | Rodgers et al. | |
| 4,701,055 A | 10/1987 | Anderson | |
| 4,719,252 A | 1/1988 | Dutton et al. | |
| 4,747,978 A | 5/1988 | Loehr et al. | |
| 4,752,740 A | 6/1988 | Steininger | |
| 4,798,702 A | 1/1989 | Tucker | |
| 4,863,608 A | 9/1989 | Kawai et al. | |
| 4,913,822 A | 4/1990 | Chen et al. | |
| 4,952,376 A | 8/1990 | Peterson | |
| 4,965,016 A | 10/1990 | Saitoh et al. | |
| 4,977,292 A | 12/1990 | Hwa et al. | |
| 4,990,260 A | 2/1991 | Pisani | |
| 5,000,866 A | 3/1991 | Woyciesjes | |
| 5,004,549 A | 4/1991 | Wood et al. | |
| 5,018,871 A | 5/1991 | Brazelton et al. | |
| 5,024,766 A | 6/1991 | Mahmud | |
| 5,030,334 A | 7/1991 | Hale | |
| 5,032,218 A | 7/1991 | Dobson | |
| 5,061,456 A | 10/1991 | Brazelton et al. | |
| 5,069,885 A | 12/1991 | Ritchie | |
| 5,073,268 A | 12/1991 | Saito et al. | |
| 5,112,521 A | 5/1992 | Mullins et al. | |
| 5,116,509 A | 5/1992 | White | |
| 5,118,422 A | 6/1992 | Cooper et al. | |
| 5,130,033 A | 7/1992 | Thornhill | |
| 5,135,968 A | 8/1992 | Brazelton et al. | |
| 5,139,627 A | 8/1992 | Eden et al. | |
| 5,164,429 A | 11/1992 | Brazelton et al. | |
| 5,213,694 A | 5/1993 | Craig | |
| 5,230,822 A | 7/1993 | Kamel et al. | |
| 5,236,602 A | 8/1993 | Jackson | |
| 5,239,257 A | 8/1993 | Muller et al. | |
| 5,256,307 A | 10/1993 | Bachhofer et al. | |
| 5,262,963 A | 11/1993 | Stana et al. | |
| 5,302,356 A | 4/1994 | Shadman et al. | |
| 5,306,355 A | 4/1994 | Lagana | |
| 5,306,432 A | 4/1994 | Puetz | |
| 5,316,031 A | 5/1994 | Brazelton et al. | |
| 5,320,748 A | 6/1994 | Dupuis | |
| 5,332,511 A | 7/1994 | Gay et al. | |
| 5,348,665 A | 9/1994 | Schulte et al. | |
| 5,352,359 A | 10/1994 | Nagai et al. | |
| 5,382,367 A | 1/1995 | Zinkan et al. | |
| 5,422,013 A | 6/1995 | Hirofuji | |
| 5,422,014 A | 6/1995 | Allen et al. | |
| 5,424,032 A | 6/1995 | Christensen et al. | |
| 5,443,991 A | 8/1995 | Godec et al. | |
| 5,470,480 A | 11/1995 | Gray et al. | |
| 5,489,344 A | 2/1996 | Martin et al. | |
| 5,494,588 A | 2/1996 | LaZonby | |
| 5,501,801 A | 3/1996 | Zhang et al. | |
| 5,518,629 A | 5/1996 | Perez et al. | |
| 5,571,419 A | 11/1996 | Obata et al. | |
| 5,575,920 A | 11/1996 | Freese et al. | |
| 5,587,069 A | 12/1996 | Downey, Jr. | |
| 5,639,476 A | 6/1997 | Oshlack et al. | |
| 5,658,467 A | 8/1997 | LaZonby et al. | |
| 5,675,153 A | 10/1997 | Snowball | |
| 5,683,654 A | 11/1997 | Dallmier et al. | |
| 5,736,097 A | 4/1998 | Ono | |
| 5,753,106 A | 5/1998 | Schenck | |
| 5,770,039 A | 6/1998 | Rigney et al. | |
| 5,779,912 A | 7/1998 | Gonzalez-Martin et al. | |
| 5,783,092 A | 7/1998 | Brown et al. | |
| 5,785,845 A | 7/1998 | Colaiano | |
| 5,785,867 A | 7/1998 | LaZonby et al. | |
| 5,790,934 A | 8/1998 | Say et al. | |
| 5,798,271 A | 8/1998 | Godec et al. | |
| 5,800,732 A | 9/1998 | Coughlin et al. | |
| 5,814,233 A | 9/1998 | Starkey et al. | |
| 5,814,247 A | 9/1998 | Derule et al. | |
| 5,820,256 A | 10/1998 | Morrison | |
| 5,849,985 A | 12/1998 | Tieckelmann et al. | |
| 5,855,791 A | 1/1999 | Hays et al. | |
| 5,858,246 A | 1/1999 | Rafter et al. | |
| 5,858,249 A | 1/1999 | Higby | |
| 5,866,013 A | 2/1999 | Kessler et al. | |
| 5,882,526 A | 3/1999 | Brown et al. | |
| 5,888,374 A | 3/1999 | Pope et al. | |
| 5,895,565 A | 4/1999 | Steininger et al. | |
| 5,902,751 A | 5/1999 | Godec et al. | |
| 5,947,596 A | 9/1999 | Dowd | |
| 5,972,196 A | 10/1999 | Murphy et al. | |
| 5,980,758 A | 11/1999 | LaZonby et al. | |
| 5,985,155 A | 11/1999 | Maitland | |
| 6,015,484 A | 1/2000 | Martinchek et al. | |
| 6,030,842 A | 2/2000 | Peachey-Stoner | |
| 6,045,706 A | 4/2000 | Morrison et al. | |
| 6,063,638 A | 5/2000 | Small et al. | |
| 6,068,012 A | 5/2000 | Beardwood et al. | |
| 6,090,296 A | 7/2000 | Oster | |
| 6,096,283 A | 8/2000 | Cooper et al. | |
| 6,106,770 A | 8/2000 | Ohki et al. | |
| 6,120,619 A | 9/2000 | Goudiakas et al. | |
| 6,120,698 A | 9/2000 | Rounds et al. | |
| 6,132,593 A | 10/2000 | Tan | |
| 6,143,184 A | 11/2000 | Martin et al. | |
| 6,146,538 A | 11/2000 | Martin | |
| 6,149,819 A | 11/2000 | Martin et al. | |
| 6,159,552 A | 12/2000 | Riman et al. | |
| 6,238,555 B1 | 5/2001 | Silveri et al. | |
| 6,284,144 B1 | 9/2001 | Itzhak | |
| 6,315,950 B1 | 11/2001 | Harp et al. | |
| 6,409,926 B1 | 6/2002 | Martin | |
| 6,419,817 B1 | 7/2002 | Martin | |
| 6,423,234 B1 | 7/2002 | Martin | |
| 6,461,519 B1 | 10/2002 | Weltzer | |
| 6,464,867 B1 | 10/2002 | Morita et al. | |
| 6,468,433 B1 | 10/2002 | Tribelski | |

(56) References Cited

U.S. PATENT DOCUMENTS

| | | |
|---|---|---|
| 6,503,464 B1 | 1/2003 | Miki et al. |
| 6,596,148 B1 | 7/2003 | Belongia et al. |
| 6,620,315 B2 | 9/2003 | Martin |
| 6,623,647 B2 | 9/2003 | Martin |
| 6,645,400 B2 | 11/2003 | Martin |
| 6,716,359 B1 | 4/2004 | Dennis, II |
| 6,776,926 B2 | 8/2004 | Martin |
| 6,780,328 B1 | 8/2004 | Zhang |
| 6,884,391 B1 | 4/2005 | Khoe et al. |
| 6,902,653 B2 | 6/2005 | Carmignani et al. |
| 6,942,779 B2 | 9/2005 | Belongia et al. |
| 6,991,733 B2 | 1/2006 | Kin et al. |
| 6,991,735 B2 | 1/2006 | Martin |
| 7,108,781 B2 | 9/2006 | Martin |
| 7,285,223 B2 | 10/2007 | Martin |
| 8,357,305 B2 | 1/2013 | Theodore et al. |
| 8,591,730 B2 | 11/2013 | Yong et al. |
| 2001/0007314 A1 | 7/2001 | Sherman |
| 2002/0043650 A1 | 4/2002 | Martin |
| 2002/0117631 A1 | 8/2002 | Gadgil et al. |
| 2002/0152036 A1 | 10/2002 | Martin |
| 2003/0010695 A1 | 1/2003 | Kool et al. |
| 2003/0019803 A1 | 1/2003 | Woodard et al. |
| 2004/0005242 A1 | 1/2004 | Koulik et al. |
| 2004/0112838 A1 | 6/2004 | Martin |
| 2005/0029170 A1 | 2/2005 | Urquhart et al. |
| 2005/0056597 A1 | 3/2005 | Fries et al. |
| 2005/0139530 A1* | 6/2005 | Heiss ............................ 210/85 |
| 2005/0173341 A1* | 8/2005 | Salinaro ....................... 210/636 |
| 2005/0199483 A1 | 9/2005 | Kroll |
| 2005/0218082 A1 | 10/2005 | Williamson et al. |
| 2005/0263716 A1 | 12/2005 | From et al. |
| 2006/0131245 A1 | 6/2006 | Dennis et al. |
| 2006/0169646 A1 | 8/2006 | Andree et al. |
| 2007/0090051 A1* | 4/2007 | Minegishi et al. ............ 210/651 |
| 2007/0102359 A1 | 5/2007 | Lombardi et al. |
| 2007/0119779 A1 | 5/2007 | Muramoto et al. |
| 2008/0149485 A1 | 6/2008 | Childers et al. |
| 2008/0152548 A1 | 6/2008 | Clark et al. |
| 2008/0179242 A1 | 7/2008 | Mukhopadhyay |
| 2008/0245738 A1 | 10/2008 | Coulter |
| 2009/0084734 A1 | 4/2009 | Yencho |
| 2009/0145855 A1 | 6/2009 | Day et al. |
| 2010/0025337 A1 | 2/2010 | Yencho |
| 2010/0078574 A1 | 4/2010 | Cooper et al. |
| 2011/0024361 A1 | 2/2011 | Schwartzel et al. |
| 2011/0024365 A1 | 2/2011 | Yong et al. |
| 2011/0171080 A1 | 7/2011 | Lo |
| 2011/0180485 A1 | 7/2011 | Sitkiewitz et al. |
| 2011/0209530 A1 | 9/2011 | Coulter |
| 2011/0210048 A1 | 9/2011 | Coulter |
| 2011/0210077 A1 | 9/2011 | Coulter |
| 2011/0210266 A1 | 9/2011 | Coulter |
| 2011/0210267 A1 | 9/2011 | Coulter |
| 2011/0243665 A1 | 10/2011 | Theodore et al. |
| 2011/0259832 A1 | 10/2011 | Castillo Rivera et al. |
| 2011/0318237 A1 | 12/2011 | Woodling et al. |
| 2013/0186835 A1 | 7/2013 | Coulter |

FOREIGN PATENT DOCUMENTS

| | | |
|---|---|---|
| CN | 1539750 | 10/2004 |
| CN | 201473358 U | 5/2010 |
| DE | 262139 C | 11/1988 |
| DE | 4312417 A1 | 10/1994 |
| DE | 19530086 A1 | 2/1997 |
| DE | 19844179 A1 | 3/2000 |
| DE | 19949434 A1 | 4/2001 |
| EP | 0011776 A1 | 6/1980 |
| EP | 0257740 A1 | 3/1988 |
| EP | 0504621 A1 | 9/1992 |
| EP | 0616975 A2 | 9/1994 |
| EP | 1057784 A1 | 12/2000 |
| FR | 2672058 A1 | 7/1992 |
| GB | 2027004 A | 2/1980 |
| GB | 2281742 A | 3/1995 |
| GB | 2306463 A | 5/1997 |
| GB | 2426513 A | 11/2006 |
| JP | 59-150589 | 8/1984 |
| JP | 60-202792 A | 10/1985 |
| JP | 11-28479 A | 2/1999 |
| JP | 11-033542 A | 2/1999 |
| JP | 11-057752 A | 3/1999 |
| JP | 11-099395 A | 4/1999 |
| JP | 11-290878 A | 10/1999 |
| LU | 80951 A1 | 6/1979 |
| WO | 89/08728 A1 | 9/1989 |
| WO | 95/15294 | 6/1995 |
| WO | 96/30307 A1 | 10/1996 |
| WO | 00/34760 A1 | 6/2000 |
| WO | 01/98558 A2 | 12/2001 |
| WO | 03/031338 A2 | 4/2003 |
| WO | 2004/108607 A1 | 12/2004 |
| WO | 2007/146671 A2 | 12/2007 |
| WO | 2008150541 A1 | 12/2008 |
| WO | 2009/096662 A2 | 8/2009 |

OTHER PUBLICATIONS

Ryan, D. et al., "Waste Not, Want Not: Avoiding Chemical Excesses," reprinted from Operations Forum, vol. 11, No. 4, Apr. 1994.

Sadik W/ & G. Shama, Uv-induced Decolourization of an Azo Dye by Homogeneous Advanced Oxidation Process, pp. 310-313, 2002.

Santa Barbara Control Systems, "Chemtrol™ PC Programmable Controllers: Integrated Water Treatment with Remote Control," Product Literature, (date unknown).

Scully et al., Disinfection Interference in Wastewaters by Natural Organic Nitrogen Compounds, Environ. Sci. Techn., vol. 30, No. 5, 1996, pp. 1465-1471.

Selvick, E., "Take Control of 'Yo-Yo' Treatment Cycles," International Aquatics, National Trade Publications, Inc., Jul./Aug. 1997.

Stranco, "Solutions: Effluent Dechlorination", Stranco Product Literature (date unknown).

Stranco, "The Best of Poolfax," The Poolfax Newsletter, 1981-1984.

Strand, R. et al., "ORP As a Measure of Evaluating and Controlling Disinfection in Potable Water," (Source and date unknown).

U.S. Filter/Stranco, "Abstracts of Strancol ECS Case Histories," (date unknown).

U.S. Filter/Stranco, "Air & Water Quality Control for Indoor Aquatic Facilities," U.S. Filter Corporation, 1998.

U.S. Filter/Stranco, "ECS-Pool (w/CHF-150) Engineering Packet," Apr. 22, 1999.

U.S. Filter/Stranco, "Environmental Control at Indoor Pool Complex: New ECS System Optimizes Air & Water Quality at Colorado Recreation Center," Stranco Products Capsule Case History #807, Nov. 1998.

U.S. Filter/Stranco, "Environmental Control at Indoor Pool: ECS System Eliminates Chronic Air Quality Problems at High School and Parks District Indoor Pool Facility," Stranco Products Capsule Case History #813, Jul. 2000.

U.S. Filter/Stranco, "Environmental Control at Indoor Pool: ECS System Optimizes Air & Water Quality at Iowa Recreation Center," Stranco Products Capsule Case History #814, May 2000.

U.S. Filter/Stranco, "Environmental Control at Indoor Pool: ECS System Optimizes Air & Water Quality at Texas School District Swim Center," Stranco Products Capsule Case History #811, Nov. 1999.

U.S. Filter/Stranco, "Environmental Control at Indoor Pool: New ECS System Eliminates Chronic Air Quality Woes for New York School District Pool," Stranco Products Capsule Case History #806, Jul. 1998.

U.S. Filter/Stranco, "Environmental Control at Indoor Pool: Parks District Uses New ECS System to Eliminate Chronic Air Quality Problems at High School Pool," Stranco Products Capsule Case History #808, May 1999.

U.S. Filter/Stranco, "Environmental Control at Special Indoor Pool: New ECS System Eliminates Chronic Air Quality Woes in School District Pool & Spa Serving Special Needs Children," Stranco Products Capsule Case History #812, Oct. 1999.

(56) References Cited

OTHER PUBLICATIONS

U.S. Filter/Stranco, "Environmental Control System Training Meeting, Mar. 15, 2000".
U.S. Filter/Stranco, "Remote Monitoring for Unstaffed Pools," Parks & Recreation, Nov. 1997.
U.S. Filter/Stranco, "Ryznar Stability Index The 3rd Dimension Needed for Proper 'Water Balance,'" Aquatic Technology Newsletter, vol. 1, No. 1, pp. 1-3.
U.S. Filter/Stranco, "Strantrol Automated Water Chemistry Control for Commercial Pools," 1998.
U.S. Filter/Stranco, "Strantrol ECS—Environmental Control System (For Pool)," 2000.
U.S. Filter/Stranco, "Strantrol System 3 Pool & Spa Chemistry Controller," 2000.
U.S. Filter/Stranco, "Strantrol System 4 Pool & Spa Chemistry Controller," 2000.
U.S. Filter/Stranco, "Strantrol System5F Pool & Spa Chemistry Controller," 2000.
U.S. Filter/Stranco, "Strantrol System6 Pool Chemistry & Filter Backwash Controller," 2000.
U.S. Filter/Stranco, "Strantrol System7 Mechanical Room Controller for Aquatic Facilities," 2000.
U.S. Filter/Stranco, "The Chemistry and Control of Chloramines," Aquatic Technology Newsletter, vol. 1, No. 4, 1999, pp. 1-5.
U.S. Filter/Stranco, "The Relationship of ORP to PPM and Its Automated Control," Aquatic Technology Newsletter, vol. 1, No. 3, 1999, pp. 1-5.
U.S. Filter/Stranco, "Total Dissolved Solids, Friend or Foe?", Aquatic Technology Newsletter, vol. 1, No. 2, 1988; pp. 1-7.
U.S. Filter/Stranco, "Why Do I Have Algae in My Pool?" Aquatic Technology Newsletter, vol. 1, No. 6, 1999, pp. 1-2.
U.S. Filter/Stranco, "Yes, Your Pool Needs Calcium Too," Aquatic Technology Newsletter, vol. 1, No. 5, pp. 1-3.
Victorin et al., "Redox potential measurements for determining the disinfecting power of chlorinated water," J. Hyg., Camb., 70, 1972, pp. 313-323.
White, Geor. Clifford, Handbook of Chlorination and Alternative Disinfectants, Third Edition, (date unknown), pp. 801, 803-809, 922-924.
Williams, K., "Aquatic Facility Operator Manual," National Recreation and Park Association, Second Edition, 1995.
Yu et al., Free Radical Reactions Involving Cl*, Cl2-*, and SO4-* in the 248 nm Photolysis of Aqueous Solutions Containing S2O82- and Cl-, J. Phys. Chem. A 2004, 108, 295-308.
"Acu-Trol Programmable Controllers," Product Literature from www.acu-trol.com, printed Nov. 19, 1999.
"Chemtrol—PC3000 Controller," Product Literature from www.sbcontrol.com, printed Nov. 19, 1999.
"Chemtrol—PC6000 Controller," Product Literature from www.sbcontrol.com, printed Nov. 19, 1999.
"Louisiana Plant Uses New Technology for Dechlorination," reprinted from American City & County, Feb. 1994.
Acu-Trol Programmable Controllers, "AT-8 Programmable Chemical Controller," Product Literature, 2006.
Acu-Trol, "Acu-Trol Programmable Controllers: AK100 Series and AK200," Product Literature (date unknown).
Acu-Trol, "AK100 Series" Product Literature (date unknown).
Acu-Trol, "AK100 Summary," Product Literature from www.acu-trol.com, printed Nov. 19, 1999.
Anipsitakis, George P. et al., "Transition Meta/UV-based Advanced Oxidation Technologies for Water Decontamination," Applied Catalysis B: Environmental 54 (2004), pp. 155-163.
Aquasol Controllers, Inc., "Aquasol SPC Specifications," Product Literature from www.aquasol.com, printed Nov. 19, 1999.
Aquasol Controllers, Inc., "Aquasol WTC Specifications," Product Literature from www.aquasol.com, printed Nov. 19, 1999.
Aquasol Controllers, Inc., "Aquasol WTC," Product Literature, (date unknown).
Aquasol Controllers, Inc., "What is a Controller?" Product Literature from www.aquasol.com, printed Nov. 19, 1999.

Aquasol Controllers: Chemical Automation for Pools and Spas, Product Literature (date unknown).
Batt, T. et al., "The Water Down Under," Parks & Recreation, Nov. 1999.
Bossard, G. et al., "Optimizing Chlorination/Dechlorination at a Wastewater Treatment Plant," reprinted from Public Works, Jan. 1995.
Brusamarello et al., "Analysis of Different Methods to Calculate Electrochemical Noise Resistance Using a Three-Electrode Cell," Corrosion, vol. 56, No. 3, Mar. 2000, pp. 273-282.
Carlson, S., "Fundamentals of water disinfection," J Water SRT—Aqua, vol. 40, No. 6, (1991), pp. 346-356.
Carpenter, Colleen et al., "Chlorine Disinfection of Recreational Water for *Cryptosporidium parvum*," Emerging Infectious Diseases, vol. 5, No. 4, Jul.-Aug. 1999, pp. 579-584.
Cat Controllers, "CAT 2000+ Programmable Water Chemistry Controller," Product Literature (date unknown).
Chemtrol Automatic Pool Controllers, Product Literature from www.sbcontrol.com, printed Nov. 19, 1999.
Cooper, J.F. et al., Final Report: Fiscal Year 1997 Demonstration of Omnivorous Non-Thermal Mixed Waste Treatment Direct Chemical Oxidation of Organic Solids and Liquids using Peroxydisulfate, Lawrenec Livermore National Laboratory, Jan. 1998.
D'Adam, D. et al., "A Case Study of Wastewater Plant Disinfection," reprinted from Public Works Magazine, Nov. 1994.
Dexter et al., "Use and Limitations of Electrochemical Techniques for Investigating Microbiological Corrosion", Corrosion, 1991, vol. 47, No. 4, pp. 308-318.
Eddington, Gordon, "Successfully Managing Wastewater Chlorination," Stranco Product Literature (date unknown).
Frazier, B., "Automation to the Rescue," Aquatics International, May/Jun. 1998.
Gusmano et al., "Electrochemical Noise Resistance as a Tool for Corrosion Rate Prediction", Corrosion, 1997, vol. 53, No. 11, pp. 860-868.
Hensley, R. et al., "Disinfection Metamorphosis: From Chemicals to Control," Operations Forum, vol. 12, No. 4, Apr. 1995.
Hetzler, J.T. et al., "ORP: A Key to Nutrient Removal," Operations Forum, vol. 12, No. 2, Feb. 1995.
Kim, Yong H., "Evaluation of Redox Potential and Chlorine Residual as a Measure of Water Disinfection," presented at the 54th International Water Conference, Pittsburgh, PA, Oct. 11-13, 1993.
Kim, Yong H., "On the Activation of Polymeric Flocculants," AIChE Annual Spring Meeting, Houston, TX, Apr. 2-6, 1989.
Kiser, P. et al., "ORP or Residual: Which Measures Oxidation?" Sep. 10, 1992, pp. 1-7.
Kloberdanz, B., "The Air in There: Enhancing an Indoor Pool Environment," Recreation Management, 2000.
Kowalsky, L., "Pool-Spa Operators Handbook," National Swimming Pool Foundation, 1983-1990.
Krone, D., "Automated Water Chemistry Control at University of Virginia Pools," Facilities Manager, vol. 13, No. 6, Nov./Dec. 1997.
Lund et al., "The Effect of Oxidation and Reduction on the Infectivity of Poliomyelitis Virus," from the Virological Laboratory of the Department of Bacteriology, University of Gothenburg, and the Virological Department of the Municipal Laboratories, Gothenburg, Sweden, Springer-Verlag, (1961), pp. 100-110.
Lund, E., "Inactivation of Poliomyelitis Virus by Chlorination at Different Oxidation Potentials," from the Virological Laboratory of the Department of Bacteriology, University of Gothenburg, and the Virological Department of the Municipal Laboratories, Gothenburg, Sweden, Springer-Verlag, (1961), pp. 330-342.
Lund, E., "Oxidative Inactivation of Poliovirus," from the Virological Laboratory of the Department of Bacteriology, University of Gothenburg, and the Virological Department of the Municipal Laboratories, Gothenburg, Sweden, Springer-Verlag, (1963), pp. 1-49.
Lund, E., "The Rate of Oxidative Inactivation of Poliovirus and its Dependence on the Concentration of the Reactants," from the Virological Laboratory of the Department of Bacteriology, University of Gothenburg, and the Virological Department of the Municipal Laboratories, Gothenburg, Sweden, Springer-Verlag, (1963), pp. 1-18.
Lund, E., "The Significance of Oxidation in Chemical Inactivation of Poliovirus," from the Virological Laboratory of the Department of

(56) References Cited

OTHER PUBLICATIONS

Bacteriology, University of Gothenburg, and the Virological Department of the Municipal Laboratories, Gothenburg, Sweden, Springer-Verlag, (1963), pp. 1-13.

Lynntech, Inc., "Electrochemical Ozone Generator," Model 124 Product Literature (date unknown).

Mansfeld et al., "Electrochemical Noise Analysis of Iron Exposed to NaCl Solutions of Different Corrosivity," J. Electrochem. Soc., vol. 141, No. 5, May 1994, pp. 1402-1404.

Mikkelson, Ken, et al., "Development of the AquaMB ProcessTM", Aqua-Aerobic Systems, Inc., 2003.

Minton, E., "On the Waterpark," Swimming Pool/Spa Age (date unknown).

Normenausschusse Wasserwesen, "Treatment and disinfection of water used in bathing facilities," DIN 19643-1, Apr. 1997.

Normenausschusse Wasserwesen, "Treatment and disinfection of water used in bathing facilities," DIN 19643-2, Apr. 1997.

Normenausschusse Wasserwesen, "Treatment and disinfection of water used in bathing facilities," DIN 19643-3, Apr. 1997.

Normenausschusse Wasserwesen, "Treatment and disinfection of water used in bathing facilities," DIN 19643-4, Feb. 1999.

Nowell, Lisa H. et al., "Photolysis of Aqueous Chlorine at Sunlight and Ultraviolet Wavelengths-II. Hydroxyl Radical Production," Water Research, vol. 26, No. 5, May 26, 1992, pp. 599-605, Marsh Barton, Exeter, Great Britain.

Pool and Spa Controller: Acu-200 Pool Management Software, Product Literature (date unknown).

\* cited by examiner

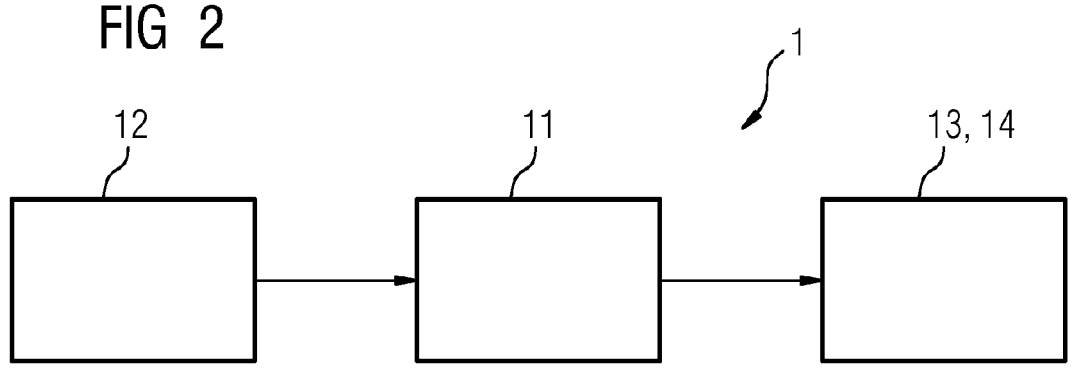

METHOD AND ARRANGEMENT FOR A WATER TREATMENT

TECHNICAL FIELD OF THE INVENTION AND PRIOR ART

The present invention relates to water treatment using an UV AOP.

Within the last years many research works showed a suitability of Advanced Oxidation Processes (AOPs) for many applications, especially for water treatment ("Photocatalysis with solar energy at a pilot-plant scale: an overview", Malato et al., Applied Catalysis B: Environmental 37 (2002) 1-15; "Figures of Merit for the technical development and application of Advanced Oxidation Processes", Bolton et al., J. of Advanced Oxidation Technologies, 1, 1 (1996) 13-17).

Advanced Oxidation Processes (AOPs) for water treatment use a potential of high reactive radial species, mainly hydroxyl radicals (OH*), for oxidation of toxic or non or less biodegradable hazardous water contaminants.

Due to the high oxidation potential and low selectivity of the hydroxyl radicals, therefore reacting with almost every organic compound, the AOP can therefore be used to eliminate the contaminants, i.e. residuals of pesticides, pharmaceuticals, personal care products or x-ray contrast media, from (contaminated) water.

A versatility of AOPs is also enhanced by the fact that they offer different possible ways for hydroxyl radicals production, thus allowing a better compliance with specific treatment requirements.

A suitable, traditionally application of AOP to wastewater treatments must consider that they make use of expensive reactants/oxidants such as $H_2O_2$, and/or $O_3$ for generating hydroxyl radicals.

"Photocatalysis with solar energy at a pilot-plant scale: an overview", Malato et al., Applied Catalysis B: Environmental 37 (2002) 1-15 review a use of sunlight to produce hydroxyl radicals.

At an ultraviolet driven AOP (UV AOP) UV radiation will be used to generate the hydroxyl radicals by a photolysis. Traditional UV driven AOPs for water treatment can be resumed as $UV/H_2O_2$ or UV/Ozone ($UV/O_3$) or their combinations, since $H_2O_2$ or $O_3$ are being photolysed by UV radiation producing hydroxyl radicals.

An UV driven chlorine species process as an AOP (UV/chlorine species AOP) is known from "Assessment of the UV/Chlorine process as an advanced oxidation process", Jing Jin et al., Water Research 45, 1890-1896, 2011 and "Chlorine photolysis and subsequent OH radical production during UV treatment of chlorinated water!, Michael J. Watts, et al., Water Research 41, 2871-2878, 2007, producing hydroxyl radicals by irradiating chlorinated solutions with UV.

It is further known from "Assessment of the UV/Chlorine process as an advanced oxidation process", Jing Jin et al., Water Research 45, 1890-1896, 2011, that such an UV/chlorine AOP could be a treatment option for disinfection by-products (DBPs) that are produced during chlorine disinfection in swimming pools and can be used to inactivate water-borne pathogenic microorganisms and to destroy hazardous organic compounds in drinking water and wastewater.

But these UV/chlorine species AOPs itself seem to be ecologically and economically impractically for water treatment since the chlorine species as a precursor for the reaction is most often not completely degraded during the AOP and remains hazardous for an environment or water bodies, receiving the water. This remaining chlorine species as well can generate chlorinated DBPs after the process together with remaining organic water constitutes.

Equipments for dosing as well as for a controlled dosing of chlorine species to water to be treated are known as well as equipments for irradiating water with UV, for example "Wallace & Tiernan®, Wasseraufbereitungs- und Desinfektionssysteme, Oktober 2010.

SUMMARY OF THE INVENTION

It is a first objective of the invention to provide a method and an arrangement by which the above-mentioned shortcomings in water treatment can be mitigated.

It is a second objective of the present invention to provide a method and an arrangement for an efficient, ecological and economical water treatment, especially for contaminated water and/or wastewater.

These objectives are according to the invention achieved by providing a method for a water treatment. This method comprising the following steps:

(a) adding a chlorine species to water to be treated to be dissolved (free chlorine species) in said water to be treated, (b) applying an UV AOP (Ultraviolet Advanced Oxidation Process) to said water by irradiating said water with UV irradiation while a first content of said chlorine species dissolved in said water will be degraded and a second content of said chlorine species dissolved in said water will remain in said water (remaining free chlorine species), (c) applying a chemical post treatment to said water by quenching said water to reduce said second content of said chlorine species dissolved in said water (reduced remaining free chlorine species).

These objects are according to the invention also achieved by providing an arrangement for a water treatment.

This arrangement comprises a first dosing means arranged for adding a chlorine species to water to be treated to be dissolved (free chlorine species) in said water to be treated.

This arrangement further comprises a UV source arranged for irradiating said water with UV irradiation for applying an UV AOP to said water while a first content of said chlorine species dissolved in said water will be degraded and a second content of said chlorine species dissolved in said water will remain in said water (remaining free chlorine species).

This arrangement further more comprises a second dosing means arranged for adding a quenching agent to said water for a quenching to reduce said second content of said chlorine species dissolved in said water (reduced remaining free chlorine species).

Quenching is known in chemistry as a rapid stopping of a chemical reaction by an energy transfer without an electron transfer. Quenching could be realized by adding of a further reactant, i.e. said quenching agent, removing a reactant from a reaction mixture.

In other words—invention relates to a water treatment using an UV AOP. The invention combines said UV AOP applied to said water added with a chlorine species (UV/chlorine species AOP) with a chemical post treatment, said quenching, applied to said "UV/chlorine species AOP treated" water, able to reduce a remaining content of the chlorine species dissolved in said water.

Without the chemical post treatment, that means without the quenching, the UV/chlorine species AOP can only be used with low initial chlorine species/free chlorine species concentrations for treating contaminated water before it is used, for example in water bodies or used for drinking. Chlorine as a precursor for the reaction is most often not completely degraded during the AOP and remains hazardous for the environment or water bodies, receiving the treated water. This leads to high energy consumption while reaching a targeted water quality.

By applying—as foreseen by the invention—the chemical post treatment to the "UV/chlorine species AOP treated" water, the UV/chlorine species AOP can be conducted with a higher chlorine species/free chlorine species concentration, especially a higher chlorine or chlorine dioxide concentration, than without a chemical post treatment—leading to a highly effective decontamination of the water with low energy and chemical consumption and less peoples exposure using the treated water.

That means, even the chemical post treatment—combined with the UV/chlorine species AOP—according to the invention can make the UV/chlorine species AOP usable for water treatment.

Therefore, the invention provides a new, effective process as a very efficient water treatment procedure reaching a targeted water quality at a very economic, ecological and practical way.

According to a preferred embodiment, said chlorine species to be added—for example by using a dosing means—is chlorine ($Cl_2$) or chlorine dioxide ($ClO_2$) which will be dissolved in said water as said free chlorine species. In other words, chlorine ($Cl_2$) or chlorine dioxide ($ClO_2$) can be used as precursor for said AOP reaction.

Free chlorine species is known as a concentration of residual chlorine in water present as dissolved gas ($Cl_2$), hypochlorous acid (HOCl), and/or hypochlorite ion ($OCl^-$) .as well as a concentration of residual chlorine dioxide in water.

The forms of free chlorine species exist together in equilibrium—depending by a pH value and a temperature of the water.

A controller system could be used for controlling said adding of said chlorine species as well as for controlling said adding of said quenching agent. Said adding of said chlorine species and/or said quenching agent could be realized by use of a dosing means, for example a dosage apparatus, controlled by said controller.

According to a further preferred embodiment, a concentration of said chlorine species or of said free chlorine species is measured—especially by using a measuring means—before and/or after irradiating said water with said UV irradiation.

Preferable said measuring means for measuring said concentration is a sensor measuring a free chlorine or chlorine dioxide equivalent. Such a sensor, for example a membrane sensor FC1 or a membrane sensor DC7 of Wallace & Tiernan (Wallace & Tiernan, Siemens, Water Technologies, Multi-Funktions-Analysesysteme, MFA-FC1, -CD7), is well known, long term stable while measuring and requires less maintenance costs.

As well open cell amperiometric systems can be used for such AOP analyzer and controller systems.

Measuring the concentration of said free chlorine species before irradiating said water with said UV irradiation means measuring an initial concentration of said free chlorine species before applying said UV/chlorine species AOP, i.e. before said first content of said free chlorine species will be degraded by the UV AOP.

The first dosing means could be installed in a way that allows homogenization of the added, i.e. injected, chlorine species before said chlorine species measurement and before the water to be treated reaches the UV source to be irradiated with UV.

Measuring the concentration of said free chlorine species after irradiating said water with said UV irradiation means measuring the concentration of said second content of said chlorine species dissolved in said water, i.e. measuring the concentration of said remaining free chlorine species (after applying said UV/chlorine species AOP).

Sensor signals and/or sensor data according to said measured concentration could also be processed by said controller to control the water treatment.

According to a preferred embodiment a quenching agent is added—for example by using a dosing means, especially in case of liquid quenching agents, or, especially in case of solid quenching agents, e.g. thiosulphate salts ($Na_2S_2O_3$), by using a fixed bed reactor—to said water to be treated for said quenching. Said quenching agent is reacting with and/or absorbing said second content of said chlorine species dissolved in said water, especially forming innocuous ions (chloride) and water.

Said quenching agent could be added in such an amount that said quenching agent to be added and said chlorine species to be added are in a stoichiometric equilibrium.

Said quenching agent could be e.g. hydrogen peroxide, thiosulphate, thiosulphate salts or activated carbon.

The quenching agent can be in liquid form, e.g. $H_2O_2$, or solid, e.g. thiosulphate salts ($Na_2S_2O_3$).

A concentration of said quenching agent added could also be measured, e.g. before and/or after reacting with and/or absorbing said second content of said chlorine species dissolved in said water.

According to a preferred embodiment, said chemical post treatment could be controlled by using said measured concentration of said free chlorine species, especially by using said measured concentration of said second content of said chlorine species dissolved in said water (remaining free chlorine species). A higher content of said remaining free chlorine species can lead to an increase of said chemical post treatment/quenching, especially by adding a higher amount of said quenching agent to said water.

The quenching treatment could reduce not only said second content of said chlorine species dissolved in said water but as well the chlorinated by products, e.g. as there are trihalomethanes (THMs), adsorbable organic halides (AOX), to innocuous amounts, by reducing a reaction time of chlorine with a remaining water matrix.

For application requiring residual chlorine species concentrations, said quenching process could be performed in a way controlling the remaining free chlorine species concentration and removing an excess free chlorine species. For example, the quenching treatment could be used to achieve a predetermined, required residual chlorine species concentration by reducing a remaining free chlorine species of about 6 ppm to 1 ppm by removing the excess free chlorine species.

Said UV/chlorine species AOP could be also controlled by using said measured concentration of said free chlorine species, especially by using said measured concentration of said initial free chlorine species and/or said remaining free chlorine species.

According to a preferred embodiment a weight ratio of said free chlorine species in said water to be treated and contaminants of said water to be treated could be about 1.000:1 up to about 10.000:1, especially about 3.000:1 up to about 8.000:1, preferable about 6.000:1. Said weight ratio of about 6.000:1 (free chlorine species: contaminants) will lead to very efficient and effective decontamination of said contaminated water.

According to a preferred embodiment said UV source, for example an UV lamp, is arranged in a reaction chamber while said water to be irradiated is flowing through said reaction chamber.

Said UV irradiation could be applied with an irradiation dose of about 400 J/m²-4000 J/m². Further more said UV irradiation could have a wavelength of about 100 nm-400 nm, especially having a wavelength of about 200 nm-400 nm, further more especially of about 250 nm-260 nm.

In a preferred embodiment said UV source will be a polychromatic irradiator/medium pressure UV source. Medium pressure UV sources/lamps provide an expanded wave length spectrum and could be constructed more compact.

Said UV source could also be a mono-chromatic irradiator/low pressure UV source, for example a low pressure amalgam UV lamp or a low pressure mercury UV lamp. Low pressure UV lamps are highly efficient while providing a small spectrum by a wave length of about 257, 3 nm, less energy input combined with less costs.

As well solar irradiance can be used as an UV source.

Further more an UV sensor (or more)—for a low pressure UV source or a medium pressure UV source—and/or a UV filter (or more) could be used in combination with said UV irradiation provided by said UV source, e.g. low pressure UV source or medium pressure UV source, for controlling an irradiance of said UV irradiation, especially while measuring said UV irradiation filtered by said UV filter.

According to a preferred embodiment a further filter could be used—in combination with said UV source—filtering said UV irradiation to irradiate the water, e.g. to cut-off the UV irradiation at predetermined wave length. E.g., a quartz sleeve could be used to achieve cut-off of the UV irradiation at 240 nm to irradiate said water to be treated, e.g. potable water, with UV wave length longer than 240 nm.

According to a preferred embodiment said water to be treated flows at a flow rate of 50 m³/h-1000 m³/h, especially at a flow rate of about 200 m³/h. The flow rate can be controlled/monitored by use of a flow control. Often the flow rate is a given requirement of the customers and therefore the monitoring of variations in flow rate can be used to adjust the AOP water treatment accordingly.

According to a preferred embodiment said water to be treated, for example potable water, (municipal) waste water, industrial-/process water or ultrapure water, could be contaminated water, especially water contaminated with hazardous contaminants with low bio degradability, e.g. residuals of pesticides, pharmaceuticals, personal care or x-ray contrast media. Further more said contaminated water could be contaminated with water contaminants with a low concentration of maximum 2 µg/l.

Further advantages as well as advantageous features of the invention appear from the following description.

BRIEF DESCRIPTION OF THE DRAWINGS

With reference to the appended drawings, below follows a specific description of an embodiment of the invention cited as example, water treatment using UV/chlorine species AOP with a chemical post treatment.

In the drawings:

FIG. 2 is a schematic illustration of a water treatment process according to an embodiment of the invention.

DETAILED DESCRIPTION OF AN EMBODIMENT OF THE INVENTION

Figure 1:
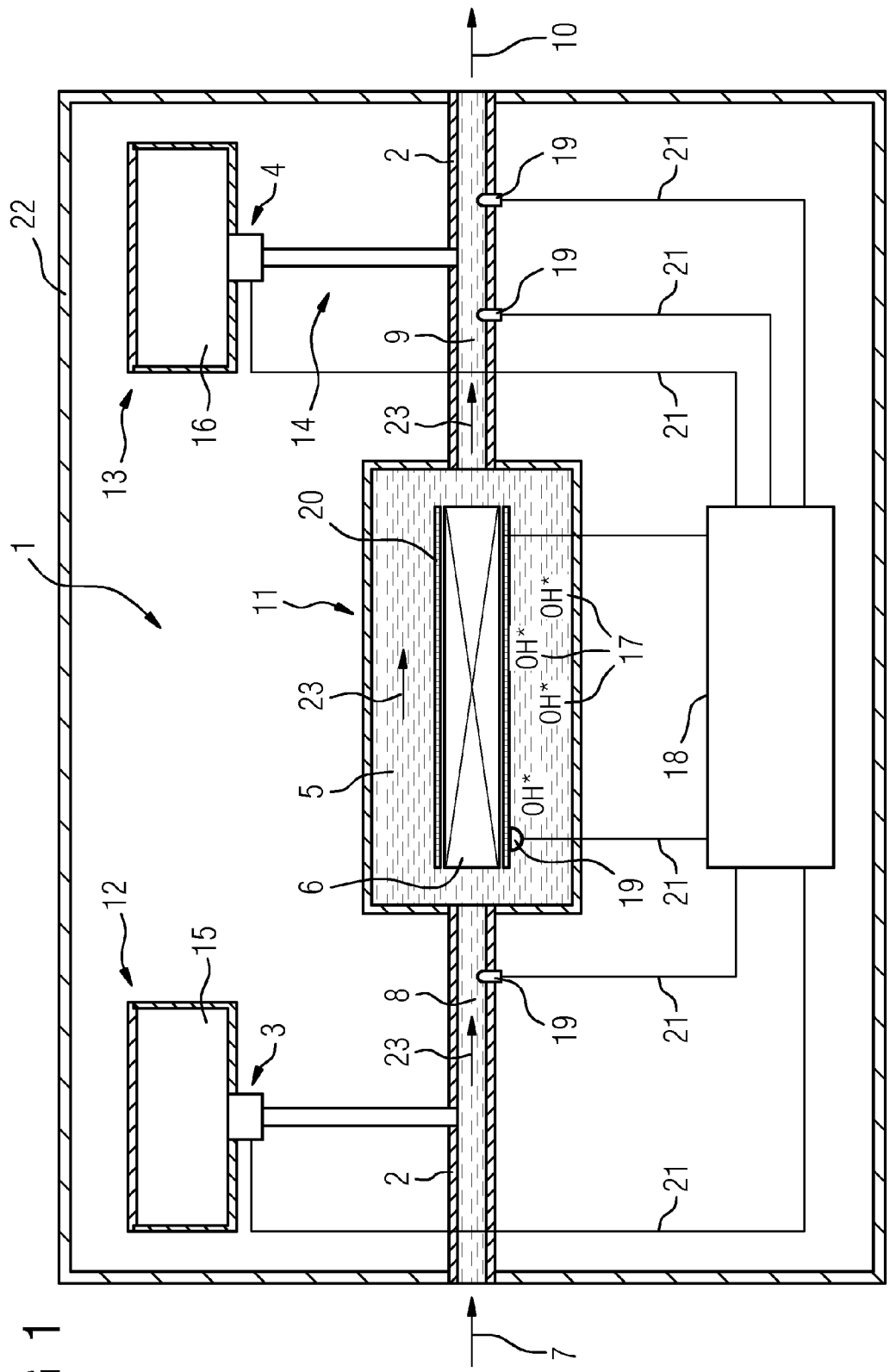
FIG. 1 is a schematic illustration of a water treatment system according to an embodiment of the invention.

The present invention is directed to an arrangement and a method for a water treatment using an UV/chlorine species AOP in combination with a chemical post treatment 1, cited also just as water treatment, as schematically illustrated in FIG. 1 and FIG. 2.

The water treatment 1 as illustrated in FIG. 1 and FIG. 2 will be used for decontaminating water, for example municipal waste water or drinking water.

The water to be decontaminated (contaminated water) 7 contains hazardous contaminants, especially residuals of pesticides, pharmaceuticals, personal care products which can be eliminated by the water treatment 1.

The contaminated water 7 will flow through a water circulation using a piping system 2 discharging said contaminated water 7 from the source (waste water treatment plant or drinking water treatment plant—not shown), pumping said discharged water 7 through the arrangement for the water treatment 1 being decontaminated by the process for the water treatment 1 and discharging the treated and decontaminated water 10 in the water body or fresh water piping system.

The arrangement for the water treatment 1 comprises three sections for treating the contaminated water 7—arranged within a housing 22. The three sections are arranged in flow direction 23 of the water to be treated so that the water can pass—fed by a pump (not shown)—the three section of the arrangement 1.

In the first section a chlorine species 15, i.e. chlorine or chlorine dioxide 15, is added 12 to the contaminated water. A dosing apparatus 3 is functionally connected to the piping system 2 arranged for adding 12 the chlorine species 15, in this case chlorine 15, to the contaminated water 7 while the contaminated water 7 is passing the first section.

The chlorine 15 added 12 to the water will be dissolved in the water as free chlorine (chlorinated water 8).

A sensor 19 is arranged within the first section for measuring the concentration of the free chlorine in the chlorinated water 8. The sensor 19 as well as the dosing apparatus 3 is connected to an analyser and controller system 18, cited as a controller 18, via a circuit 21 controlling the adding 12 of the chlorine 12.

The chlorinated water 8—leaving the first section—enters the second section, i.e. a reaction chamber 5 with one or several low pressure, mono-chromatic amalgam UV lamps 6, to be irradiated with UV irradiation. While the chlorinated water 8 being irradiated with UV an UV/chlorine AOP 11 will be processed within the chlorinated water 8.

FIG. 1 shows an UV sensor 19 and a UV filter 20 being arranged at the UV lamp 6 used for controlling the irradiance of said UV irradiation while measuring said UV irradiation filtered by said UV filter 20. The UV sensor 19 as well as the UV lamp 6 is also connected to the controller 18 via a circuit 21.

The irradiation of the chlorinated water 8—provided with an irradiation dose of about 3000 J/m²—yields radical species 17, especially OH* radicals 17, since it is possible to generate radical species 17 from irradiation of chlorine with UV.

The number of the radicals 17 depends, belong other parameters, on the initial chlorine concentration of the chlorine 15 added 12 and the irradiance of the UV source/lamps 6.

The UV/chlorine AOP 11 uses the potential of the high reactive radicals 17 for oxidation of the contaminants in the chlorinated water 8 while eliminating the contaminants of the water 8.

Chlorine as a precursor for the reaction is not completely degraded during the UV/chlorine AOP 11 and remains in the water. That means that a first content of said free chlorine will be degraded during the UV/chlorine AOP 11 while a second content of said free chlorine will remain in the water 9.

The reaction chamber 5 can have varying shape and size. FIG. 1 shows said reaction chamber 5 shaped as a cylinder being passed by the chlorinated water 8.

Leaving the reaction chamber 5 the water 9—containing the remaining free chlorine—passes the third section to be treated by a chemical post treatment 14 to reduce the content of the remaining free chlorine at a rate that will not be hazardous.

The remaining free chlorine is degraded by addition 13 of chemicals 16, i.e. quenching agents like $H_2O_2$ 16.

This is also be achieved by a dosing equipment 4, controlled by the water flow rate or the remaining oxidant, i.e. the reduced remaining free chlorine after quenching, in the water 10 via the controller 18.

The dosing apparatus 4 is functionally connected to the piping system 2 arranged for adding the quenching agent 16, in this case $H_2O_2$, to the water 9 containing the remaining free chlorine while the water 9 is passing the third section.

The quenching agent 16 added 13 to the water 9 will react with the remaining free chlorine reducing the content of the remaining free chlorine at a predetermined rate.

Leaving the third section the decontaminated water 10 will be discharged in the pool.

Sensors 19 are arranged within the third section for measuring the concentration of the remaining free chlorine in the chlorinated water 9 as well as the chlorine after quenching (remaining oxidant) 10.

The sensors 19 as well as the dosing apparatus 4 are connected to the controller 18 via a circuit 21 controlling the adding 13 of the quenching agent 16.

The invention claimed is:

1. A method for treating water comprising:
    adding a chlorine species to a water to be treated in an amount to provide a dissolved chlorine species having a weight ratio in the water to be treated relative to contaminants of the water to be treated in a range of about 1,000:1 to about 10,000:1;
    irradiating the water with ultraviolet irradiation to degrade-a first portion of the dissolved chlorine species; and
    quenching the water to reduce a second portion of the dissolved chlorine species.

2. The method of claim 1, wherein the chlorine species is one of chlorine and chlorine dioxide.

3. The method of claim 1, further comprising measuring a concentration of the dissolved chlorine species at at least one of a time before and after irradiating the water with the ultraviolet irradiation to provide a measured concentration of the dissolved chlorine species.

4. The method of claim 3, further comprising controlling the quenching based on the measured concentration of the dissolved chlorine species.

5. The method of claim 1, wherein quenching comprises adding a quenching agent to the water.

6. The method of claim 1, wherein the water to be treated comprises 2 µg/l or less of water contaminants.

7. The method of claim 1 wherein the weight ratio of the dissolved chlorine species in the water to be treated and contaminants of the water to be treated is in a range of about 3,000:1 to about 8,000:1.

8. The method of claim 7, wherein the weight ratio of the dissolved chlorine species in the water to be treated and contaminants of the water to be treated is about 6,000:1.

9. The method of claim 1, wherein irradiating comprises irradiating at a wavelength of about 100 nm to 400 nm.

10. The method of claim 1, wherein irradiating comprises irradiating at a dose of about 400 $J/m^2$ to 4000 $J/m^2$.

11. The method of claim 1, wherein the water to be treated is from a source of one of municipal water, potable water, waste water, industrial water, process water and ultrapure water.

12. The method of claim 3 wherein measuring a concentration of the dissolved chlorine species comprises measuring a concentration of the second portion of the dissolved chlorine species.

13. The method of claim 5 wherein quenching comprises reacting the quenching agent with the second portion of the dissolved chlorine species.

14. The method of claim 5 wherein quenching comprises adsorbing of the second portion of the dissolved chlorine species by the quenching agent.

15. The method of claim 5 wherein quenching comprises forming ions and water.

16. The method of claim 5 wherein the quenching agent comprises one of hydrogen peroxide, thiosulphate, thiosulphate salts and activated carbon.

* * * * *